United States Patent [19]
Ertz, III et al.

[11] Patent Number: 5,910,689
[45] Date of Patent: Jun. 8, 1999

[54] GENERATOR STANDBY BALLAST

[75] Inventors: Alexander L. Ertz, III, Germantown; Thomas A. Mascari, Jr., Memphis; Reginald J. Rodriguez, Germantown, all of Tenn.

[73] Assignee: The Bodine Company, Inc.

[21] Appl. No.: 08/847,781

[22] Filed: Apr. 28, 1997

[51] Int. Cl.⁶ .................................................. H02J 09/06
[52] U.S. Cl. ............................. 307/64; 307/66; 315/86; 362/20
[58] Field of Search .......................... 307/64, 66; 315/86, 315/87, 160, 172; 362/20

[56] References Cited

U.S. PATENT DOCUMENTS

| | | | |
|---|---|---|---|
| 3,836,815 | 9/1974 | Herzog | 307/66 |
| 3,889,152 | 6/1975 | Bodine et al. | 315/205 |
| 4,065,757 | 12/1977 | Mauch et al. | 315/86 |
| 4,107,579 | 8/1978 | Bodine et al. | 315/205 |
| 4,454,452 | 6/1984 | Feldstein | 315/86 |
| 4,486,689 | 12/1984 | Davis et al. | 307/66 |
| 4,682,078 | 7/1987 | Pascalide | 362/20 |
| 4,751,398 | 6/1988 | Ertz | 307/66 |
| 5,004,953 | 4/1991 | McDonald | 315/86 |
| 5,264,732 | 11/1993 | Fiorina et al. | 307/66 |
| 5,532,525 | 7/1996 | Kaiser et al. | 307/64 |

*Primary Examiner*—Albert W. Paladini
*Attorney, Agent, or Firm*—Pravel, Hewitt & Kimball

[57] ABSTRACT

A standby ballast for a fluorescent lamp in a lighting circuit powered normally by a main AC power supply, and in the event of main power supply failure, powered by an auxiliary standby generator, the standby ballast operable to provide AC power to the lamp for the interim between failure of main AC power supply and the supply of stabilized auxiliary AC power from the standby generator as it has started and reached normal operating condition.

9 Claims, 3 Drawing Sheets

GENERATOR STANDBY BALLAST

BACKGROUND OF THE INVENTION

Emergency lighting is required in commercial, industrial, and institutional buildings just as fire extinguishers, smoke alarms and other safety equipment. Three types of emergency lighting are common in such installations: unit equipment, engine generators and central battery systems. Unit equipment falls into two principle types: fluorescent and incandescent.

The fluorescent units are customarily combined with and within a conventional fluorescent lighting unit by merely adding the emergency ballast consisting of a battery, a battery charger, inverter and sensing circuitry adjacent the standard fluorescent ballast. The sensing circuit observes the interruption of normal AC power to the lamp unit and immediately switches on the emergency ballast which powers the light fixture for the required period which, under most state safety codes, is a period of ninety (90) minutes. U.S. Pat. No. 5,004,953 entitled Emergency Lighting Ballast for Compact Fluorescent Lamps with Integral Starters assigned to the assignee of the present invention is illustrative of one type of emergency lighting ballast.

Incandescent emergency lamp systems are usually a self-contained wall or ceiling mounted unit utilizing a sealed beam or quartz lamp and usually consists of a battery, a battery charger, and sensing circuitry. When the power fails to the incandescent system, the sensing circuitry observes the interruption and turns on the self-contained unit for the required time. Incandescent emergency illumination systems are rarely combined with installed lamps except in the central battery systems discussed below.

Central battery systems are utilized to supply power to dedicated circuits on the interruption of normal AC power. Central systems are capable of immediately supplying power to large numbers of lighting fixtures (depending upon total battery resources); however, only for the normal duration of battery supply but at least for the code required 90 minute period. U.S. Pat. No. 4,751,398 for Lighting System for Normal and Emergency Operation of light Intensity Discharge Lamps is illustrative of one type of emergency ballast, in this instance for high intensity lamps, for use with a central battery system.

Engine generators or standby generators are utilized where power must be supplied for a prolonged period of time when normal AC power fails. Such systems normally include diverse circuits rather than individual lamp units, perhaps also including machinery or other apparatus of higher power demands that are conveniently supplied from the standby source. It is usual that several seconds elapse between the AC power failure and the stabilized supply of auxiliary AC power by the generator's system. During this several second lapse of normal AC power, it is not uncommon for light systems to totally extinguish, leaving spaces in darkness for the period of time required for the standby generator to start and come up to stabilized operating speed. Most standby generators are powered by internal combustion engines, the size of which depends upon the size (kilowatts) of the generator to be driven. The procedure on starting is similar to that in starting the familiar lawn mower or automobile wherein, upon a control circuit sensing the loss of AC mains power, signals a starter to crank the internal combustion engine until the ignition catches and the system comes up to the operating speed set by the control circuit.

The present invention in its most simplistic form involves the combination of a standby ballast (bearing some similarity to emergency ballasts for fluorescent systems) with a standby generator system. As will be evident from the description of the preferred embodiments, the similarity between the generator standby ballast and the emergency ballast lie in the inclusion of a battery, a battery charging circuit and inverter driven output circuit; however, the combination of circuit elements and operating parameters of the two devices are remarkably dissimilar.

The prolonged (several second) interruption of power during the failure of normal AC power and the start-up of the engine power generator until it reaches a stable operating condition is significant in several situations. In normal commercial or institutional lighting, the several second dark period (while permitted under local emergency codes) is sufficient for panic and confusion to develop. This period of panic is manifested in a crowd sense by confusion and potential injury from an uncontrolled attempt to exit from a building. Panic is also manifested in a personal sense by anxiety, which may become exacerbated in cardiac or pulmonary distress. By the inclusion of seemingly redundant components of an additional specialized ballast to such as a unit fluorescent lamp including a battery, battery charger, inverter and sensing circuit to a standby generator system, immediate power may be supplied to selected connected loads for the duration of time it takes the generator to start up and stabilize. For applications in individual fluorescent lighting systems or combinations thereof, these generator standby ballasts units are capable of powering the lighting load at its regular level of illumination over relatively short periods of time, such as a minute or so, as the standby generator comes on to line. The generator standby ballast in the fluorescent lighting configuration normally continues the lighting load without noticeable interruption and at a level such that loss of regular AC power from the central source may go undetected as the standby generator comes on line except for alarm devices which otherwise may be tripped.

SUMMARY OF THE INVENTION

It is an object of the present invention to provide a standby ballast for a fluorescent lamp in a lighting circuit which is normally powered by a primary AC power supply and having a standby generator for providing auxiliary AC power to the lighting circuit on failure of the primary AC power supply. The standby ballast in one embodiment includes a small capacity, high discharge rate battery which is charged by a rectifier connected to the main AC power supply or the auxiliary power supply when either is supplying stabilized AC power to the lighting circuit. When AC power fails and in the interim during which the auxiliary power stabilizes as the standby generator starts and comes up to speed, the battery powers a fluorescent lamp in the lighting circuit with AC power created by an oscillator directing battery current to alternative windings of a center tapped primary coil of a transformer and the secondary winding of the transformer provides AC power to start and cause the lamp to operate substantially at its rated output for the interim.

Alternative embodiments of the invention include a standby ballast to power a multi lamp lighting fixture wherein the increased load of several lamps is supplied by a transformer having multiple primary windings in parallel and inductively coupled with multiple secondary windings in parallel to power the several lamps with substantially their rated voltage and current in order that the lamps will provide rated illumination.

DETAILED DESCRIPTION OF THE PREFERRED EMBODIMENTS

Figure 1:
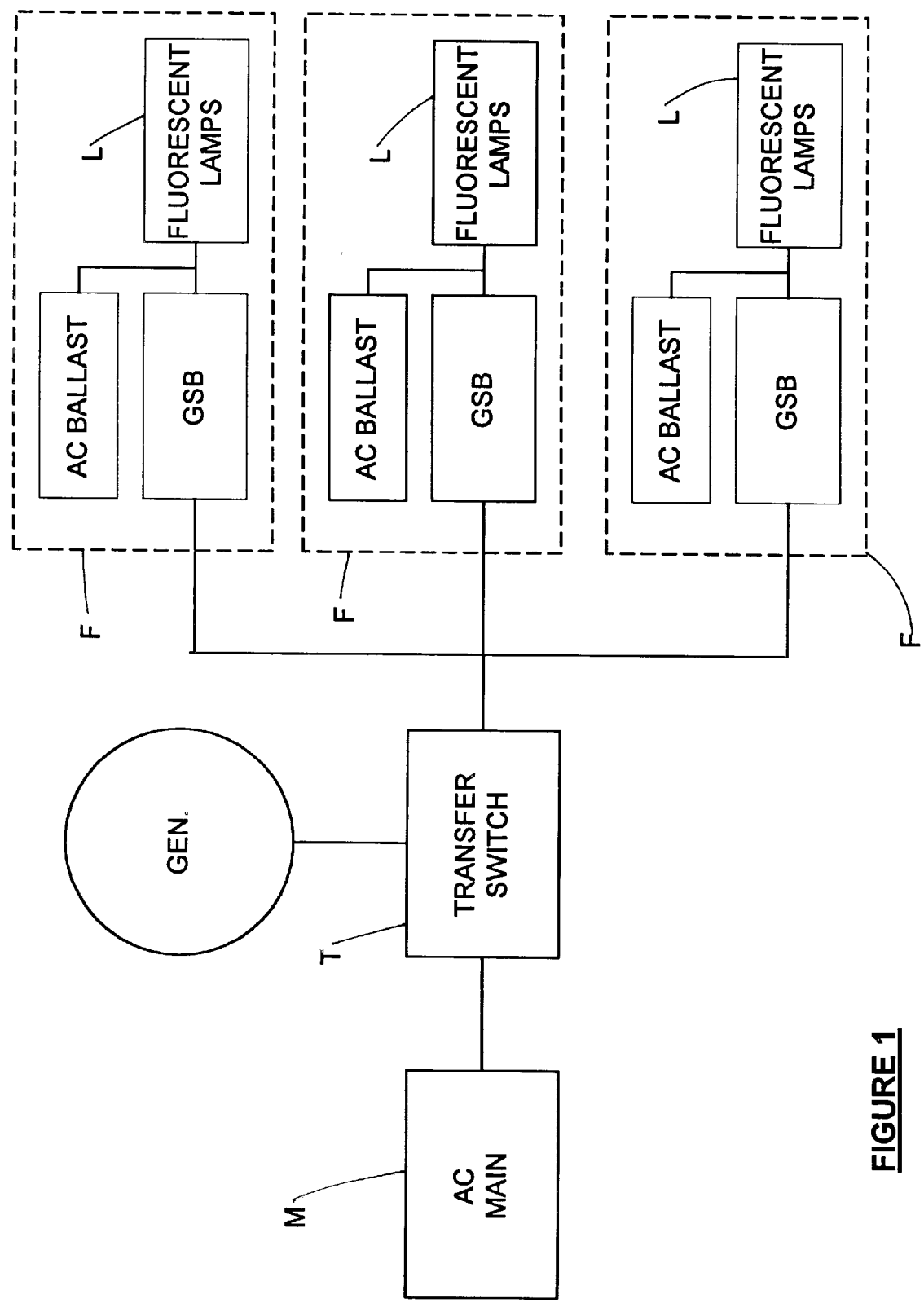
FIG. 1 is a block diagram illustrating the use of a generator standby ballast according to the present invention in a circuit including AC mains supply and a standby generator for supplying auxiliary AC power in the event the AC mains failed.

Referring now to FIG. 1, the invention is illustrated in the context of a block diagram wherein Load L represents a fluorescent lamp in light fixture F incorporating the generator standby ballast GSB, the conventional AC ballast and from one to four conventional fluorescent bulbs (designated Fluorescent Lamps) of the tube type. Load L is the conventional type of fluorescent fixture installed in commercial and office buildings. Ultimately supplying power to the fluorescent fixture load L is the AC mains supply M represented in the block diagram as the AC power conventionally supplied by a sub-station through appropriate step down transformers and distribution panels providing conventional 120 or 277 volt AC power to a particular facility, building and the like. As is well understood, power is directed through distribution panels (including circuit breakers) to specific circuits such as the one including the illustrated fluorescent fixture load L. In the present embodiment illustrated, a standby generator illustrated as GEN is connected to the AC supply, by transfer switch T, which includes conventional sensing circuitry whereby, during a failure or interruption of the AC power, the generator GEN is started and comes up to speed to take over and supply the AC power to the fluorescent future, load L. Standby generators are conventionally motor generating units incorporating an internal combustion engine driving an electric generator and are likewise well known in the art. As discussed above, typically the standby generator requires a finite period of time ranging from approximately several seconds to perhaps as much as 1 minute for the internal combustion engine to be started and to bring the generator unit up to a stabilized operating speed providing the requisite sixty-cycle AC current at line voltage (120 v. or 277 v.) Unless a lighting circuit having standby generator as the alternative power source for a failed AC power supply includes a circuit of the present invention, the fluorescent lighting loads will be dropped during the failure resulting in extinguishing of the lighting fixture lamps. In the present invention, a standby generator ballast circuit GSB, is included to provide an interim power source to such fluorescent lighting during the interim period when the standby generator is signaled to start by failure of normal AC power and comes up to stabilized frequency and voltage to take over the continuous supply of auxiliary AC power. The generator standby ballast of the present invention begins functioning immediately upon the initial loss of AC power and, as described below, provides AC power to the fluorescent lamp, load L, in a fashion which reilluminates the fluorescent lamp, should it have extinguished, on sudden loss of power and thereafter maintains the lamp at essentially full rated illumination for the period of time while the standby generator starts and comes up to stable frequency and voltage. In FIG. 1 while the generator standby ballast GSB is illustrated as a box separate and apart from the lighting mode, in actuality the generator standby ballast is mounted internally of the fluorescent lighting fixture similar to the AC ballast conventionally incorporated into a fluorescent fixture.

Figure 2:
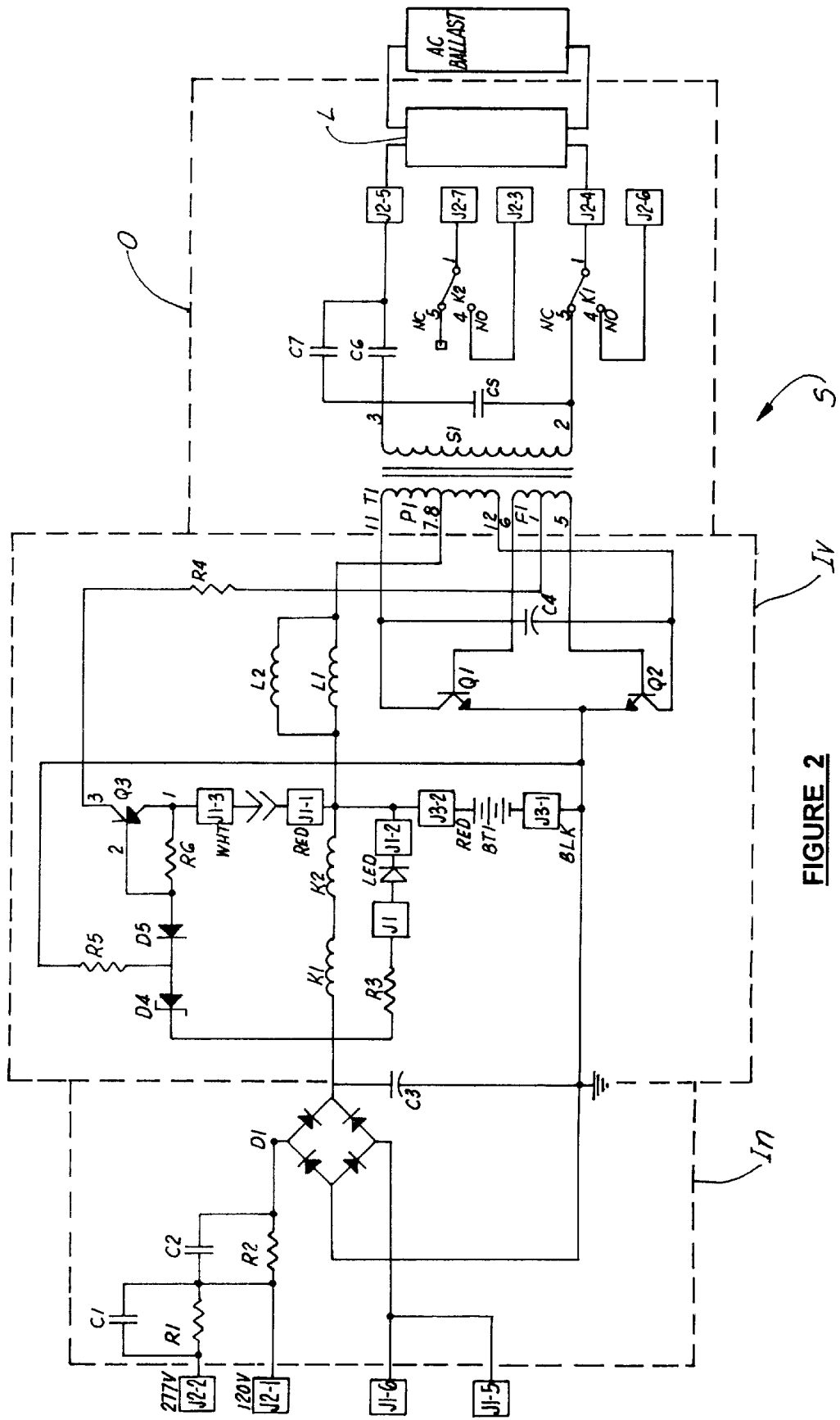
FIG. 2 is a circuit diagram of a preferred embodiment of the generator standby ballast according to the present invention.

Referring now to FIG. 2, the internal circuitry for a single lamp generator standby ballast S is illustrated. This system includes an input/charging circuit which provides charging current to the battery BT1 and disables the emergency operation mode of the generator standby ballast during the period that AC power is being supplied by either the Main M or the standby generator GEN. In preferred embodiments of generator standby ballast, the input/charging circuit has first and second input terminals J2-1 and J2-2, respectively, connectable to standard AC voltage sources such as 120 AC and 277 volts AC. Inclusion of alternative voltage connections enable the system to be selectively connected to either standard commercial voltage AC (277 volts AC) or normal residential voltage (120 volts AC). Common, or ground potential, connectors J1-6 and J1-5 complete the connections to the system input.

The two voltage terminals and the common terminal are connected to the AC inputs of a full wave (preferably) rectifier D1, the high voltage input terminal being connected via a series arrangement of a first circuit composed of a capacitor, C1, and a resistor, R1, and a second circuit composed of a capacitor, C2, and a resistor, R2. The lower voltage (e.g. 120 volts AC) terminal is connected to rectifier D1, only via the second circuit. The capacitors in the circuits serve to limit the charging current supplied to rectifier D1. The resistors are included as a safety measure to discharge the power from the capacitors after the power is removed from the circuits. The DC output from rectifier D1 is supplied to battery BT1 physical located in inverter circuit Iv via the coils of two relays, K1 and K2, and a resistor, R3, connected in series to a light emitting diode LED as an indicator that the battery BT1 is in the charging mode.

The input/charging circuit further includes a switch of relay, K2, which connects to terminal, J2-7, to a normally open contact (NO) of relay, K2, when its coil is energized and to a normally closed contact (NC) of relay, K2. When its coil is de-energized, the latter position being that illustrated in FIG. 2. Relay K1 has a similar switch and associated set of contacts which are provided in the output circuit of the standby ballast S and connects load L to the output circuit 0, when the normal AC supply or auxiliary AC supply is not powering the input/charging circuit In.

Battery BT1 may be composed of, for example, a high temperature 6 volt (sub-C) nickel cadmium battery. Alternate battery configurations are possible, dictated by the power requirements of load L. It should be noted that in the present invention that battery BT1 is chosen specifically to have a relatively low ampere-hour rating for the load imposed. It is the object of the invention to utilize a battery having a comparatively low ampere-hour capacity and to operate it at a high rate of discharge for a relatively short period of time. The combination of the battery and output circuit parameters being ultimately determined by the load imposed by the fluorescent lamp(s) connected to the output circuit and the requisite that the lamp(s) be operated at approximately its rated illumination. The configuration described provides a nominal output of 6 volts at about 1 ampere hour (AH). If the battery drives a load which has a current consumption of 6 ampere, such a battery would provide approximately 10 minutes of emergency operation. Those skilled in the art will appreciate that in the circuit described, the discharge current is materially greater than battery current of conventional emergency fluorescent lighting ballasts and for an appreciably shorter period of time than the usual ninety (90) minutes required by such codes as the National Electrical Code (NFPA-70, Article 700) and the Life Safety Code (NFPA-101, Section 5–8 through 5–10).

Similar to the tuning of the output circuit O to provide for high discharge for battery BT1, the charging circuit is of a very simple design including only the nominal resistance of the coils of relays K1 and K2 and the charging indicator light LED circuitry enabling a recharge of battery BT1.

The output circuit O includes a transformer T1 having a primary winding P1 and a feedback winding F1 on the input side of transformer T1 and a secondary winding S1 on the output side. Output circuit O provides current limiting to the fluorescent lamp load L only to the degree that is necessary to keep the lamp within its operational limits. The output circuit also provides switching by switches K1 and K2 between normal lamp operation (K1 and K2 energized) and the standby ballast mode (K1 and K2 de-energized) during which the standby generator is coming up to speed. The output circuit O is composed of a capacitor, C5, connected across the output of the secondary winding, S1, of transformer T1. Capacitors C6 and C7 connected in parallel and generally in series with the fluorescent lamp L which the circuit powers. As may be observed by those skilled in the art, the output circuit is remarkably simple in comparison to the output circuits of normal fluorescent lamps emergency ballast in that the output circuit of the generator standby ballast S provides only that current limiting necessary to keep the fluorescent lamp within its normal operating limits and allows the lamp to be connected to the otherwise unregulated full-wave AC output created from the energy supplied by battery BT1 through switching performed by the inverter circuit Iv.

AC power is supplied to load L by battery BT1 through the operation of inverter circuit Iv. Initially the operation of the generator standby ballast S is through switch Q3 which serves to place the inverter circuit in operation enabling the oscillation of switching transistors Q1 and Q2, including a high voltage surge from the output circuit C for a short interval (which may be in the order of a few milliseconds) after AC power failure to permit the starting of the fluorescent lamp. Those familiar with fluorescent lighting will recognize that a short application of an initial voltage in the range of approximately 500 volts is required to initiate the ignition of the gasses in the standard fluorescent lamp. Immediately after ignition, as switch Q3 continues to supply base current to Q1 and Q2 as later discussed, the current regulating capacitors C6 and C7 in the output circuit O regulate the current level to that required to operate the fluorescent lamp at its normal rated illumination.

In inverter circuit Iv the components controlling bi-polar transistor switch Q3 include a zener diode D4, a rectifier D5, a resistor, R5, and resistor R6. Diode D4 is connected through diode D5 to the base of transistor Q3 and the output of rectifier D1, the emitter of transistor Q3 is connected to the positive side of battery BT1 and the collector of transistor Q3 is connected through resistor R4 to the feedback winding F1 of transformer T1. The base of transistor Q3 is also connected to the negative terminal of battery BT1 through diode D5 and resistor R5. The inverter constitutes a current-fed, self-resonant, switch-mode converter supply, also known as a push-pull converter which includes primaries P1 of transformer T1, the transformer having an inductance setting gap in its core. Transformer T1 is composed of a center tapped primary winding P1, a center tapped feedback winding F1 and a high-voltage secondary winding S1, composed of a large number of turns of fine magnet wire. Two bi-polar transistors, Q1 and Q2, are connected so that the emitter/collector pad of each is connected between a respective end of the primary winding P1 and the negative terminal battery BT1 as shown. A low-voltage feedback winding, F1, of transformer T1 is connected between the bases of transistors Q1 and Q2 to provide positive feedback from primary winding P1 from transformer T1 and cause Q1 and Q2 to alternately switch the battery current through primary winding P1 creating the alternating current in secondary winding S1. Since the inverter and the transformer are being operated at relatively high current, a considerable amount of heat is generated by the inverter transistors Q1 and Q2. In order that the generated heat is dissipated over the relatively short operating period (typically several seconds to a very few minutes) the inverter circuit Iv components (at least those in close proximity to switches Q1 and Q2) and the transformer are potted with a thermally conductive material. Additionally, transistors Q1 and Q2 are each mounted in conventional heat sinks prior to potting to further promote the dissipation of generated heat during the operating period.

During normal operation when main AC power supply is functioning, charging current is supplied from the rectifier, D1, to battery BT1, while energizing relays K1 and K2 so that the switch Q3 and the oscillating switches Q1 and Q2 and the output circuit O are inactive. Should the main AC power supply fail, and for that continuing period of time prior to the standby generator coming up to normal operation, such that its frequency and voltage output again power rectifier D1, relays K1 and K2 are de-energized so that the fluorescent lamp load is connected to the output circuit O and the inverter Iv is triggered into operation.

Upon initial loss of AC power, charging current from the output of diode bridge D1 ceases, causing zener diode D4 to shut off This allows the battery BT1 to supply current through the emitter base path of transistor Q3 via diode D5 and resistor R5. Transistor Q3 is driven into saturation resulting in a current flow through resistor R4 of the inverter. Resistor R4 is given a sufficiently low resistance to supply a base current which will alternately drive transistors Q1 and Q2 to oscillate the output current of battery BT1 through the primary winding.

Once transistors Q1 and Q2 are alternately biased to the on condition, they act effectively as switches drawing current from battery BT1 through their respective emitter/collectors to the center of primary P1 of transformer T1 through inductors L1 and L2. Switch Q3 supplying current through resistor R4 to the center tap of feedback F1 of transformer T1, effectively diverts the base current to transistors Q1 and Q2 alternatively in a positive feedback mode whereby Q1 and Q2 oscillate in an on and off condition creating an AC current from battery BT1 to the center tap of primary P1 of transformer T1 which is stepped up to a high AC voltage due to the turns ratio between P1 and the secondary coil S1 of transformer T1. Resistor R4 functions to limit the current from switch Q3 through the feedback winding F1 such that transistors Q1 and Q2 are biased appropriately. Likewise capacitor C4 cross the collector circuits of Q1 and Q2 in parallel with the primary winding P1 serve to smooth the AC current generated by virtue of the alternative switching action of transistors Q1 and Q2 creating the battery supplied AC through primary P1.

The output circuit O which includes the fluorescent lamp L attached to terminals J2-5 and J2-4 to be illuminated includes also in the secondary winding S1, current limiting capacitors C6 and C7 in parallel and capacitor C5 across secondary winding S1. In operation, when the high AC voltage is initially applied to secondary S1 as switches Q1 and Q2 fire off, high voltage in the order of five hundred volts AC is applied to the load fluorescent lamp L. Because the circuit containing Lamp L is essentially capacitive, voltage spike is applied to lamp L which ensures that the lamp is started by there being sufficient voltage applied to the gases within the lamp to ensure initial conduction. As the lamp initiates its illumination the sudden rise of current flow will flow through capacitors C6 and C7 which are sized so as to limit the current to fluorescent lamp L at essentially its normal rated amount so that the lamp will provide its regular rated illumination. Capacitor CS across secondary S1 is also a current limiting impedance in the circuit to ensure that a load is always connected against secondary S1.

Figure 3:
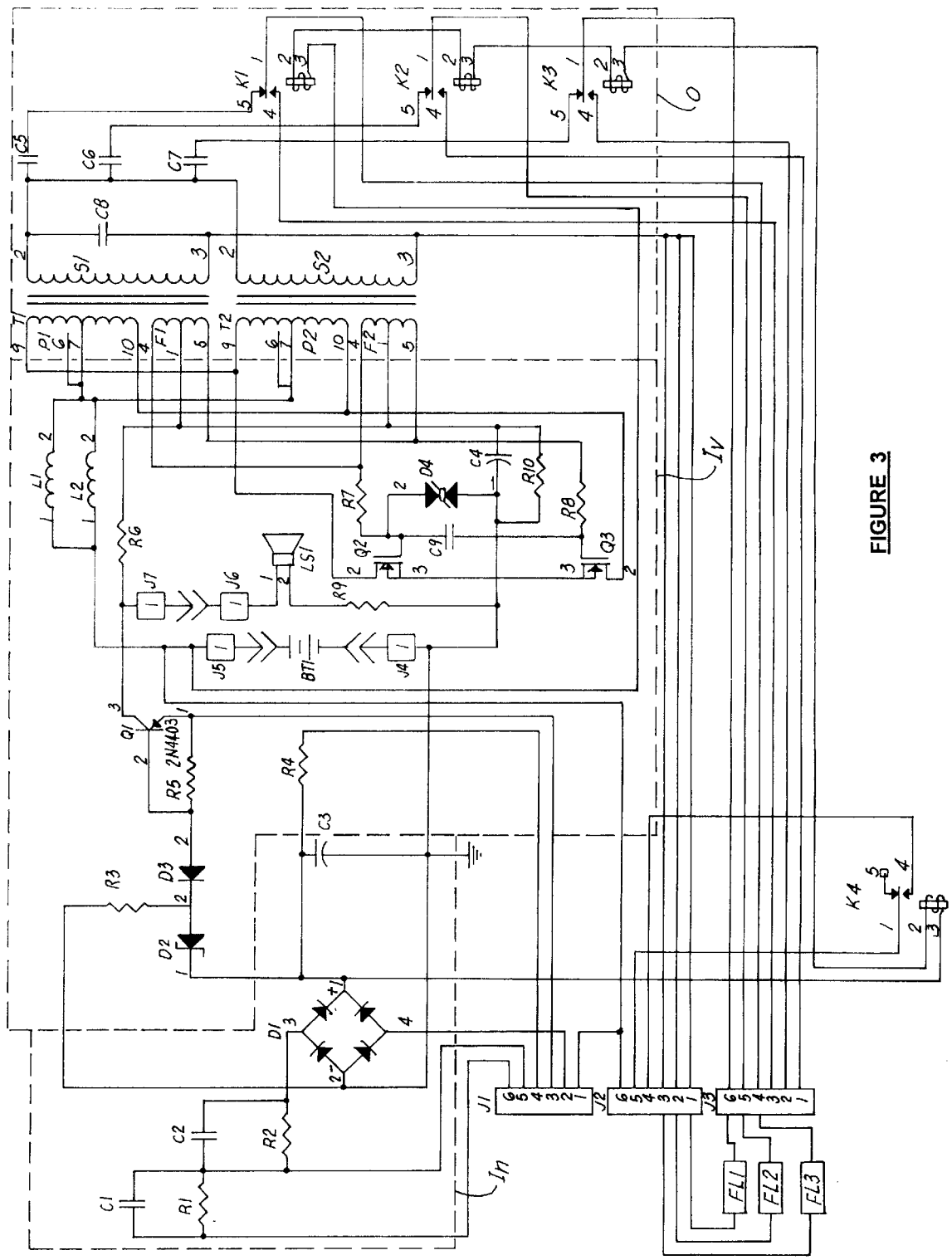
FIG. 3 is a circuit diagram illustrating an alternative embodiment of the present invention, wherein three fluorescent lamps are powered by the generator standby ballast.

In the embodiment described above and illustrated in FIG. 2, the following components were utilized:

C1 1.3 μfd
C2 2.0 μfd
C3 100 μfd
C4 0.1 μfd
C5 470 pfd
C6 2200 pfd
C7 1200 pfd
Q1 Bi-polar transistor KSE44 H11, 10 a., 80 v., 50 watts
Q2 Bi-polar transistor KSE44 H11, 10 a., 80 v., 50 watts
Q3 Bi-polar Transistor 2N4403 PNP 40 v., 600 mA, 0.6 watts
R1, R2 10M ohms
R3 560 ohms
R4 33 ohms
R5 1.8K ohms
R6 15K ohms
D1 Bridge DF06 2.6 watt, 600 v., 1 A.
D4 Zener 1N5231B 0.5 watt, 5.1 v.
D5 Rectifier 1N4005 600 v., 1 A.
K1, K2 Relay SPDT 75 ma., 6 v.,
T Transformer
    S1 275 turns, 28 ga.
    P1, 6 turns, center tapped, 23 ga.
    F1 2 turns, center tapped, 23 ga.
    Core E375 no gap TSF104400 g@25
    Core E375-TSF10.020 inch Gap
BT1 Battery NiCa, SAFT, 6.0 v., 1200 mAh Referring now to FIG. 3, an alternative embodiment of the present invention providing for generator standby ballasting of three fluorescent lamps is illustrated. The circuit in operational respects to the single lamp circuit illustrated in FIG. 2 is essentially the same. Components of the circuit of FIG. 3 are sized to provide higher output current levels in order to power three lamps rather than the single lamp in FIG. 2. Likewise, the battery BT1 is sized accordingly to provide requisite power to supply three lamps for the interim lighting period in which the standby generator comes up to speed and supplies normal AC power to lighting circuits in place of a failed AC mains supply.

The input/charging circuit In identified by the dotted line in FIG. 3 includes rectifier D1 receiving a supply from either a 277 volt AC source which would be connected at pin J1-6 or a 120 volt AC source which would be connected at pin J1-5. As in the previous embodiment resistor R1 and C1 and R2 and C2, comprise RC circuits for limiting the current to battery BT1 through rectifier D1. Capacitor C3 is included in the circuit to filter the fill wave rectified output of rectifier D1 so as to smooth the voltage across the relay coils K1, K2 and K3, thereby preventing relay chatter.

Inverter circuit Iv indicated by the dotted box on FIG. 3 includes switching transistor Q1, resistor R5, diode D3, resistor R3, and zener diode D2. During normal charging of battery BT1, the output of rectifier D1 applied through zener diode D2 biases the base of transistor Q1 in the off condition. When the AC main supply fails, charging current is no longer applied to rectifier D1 and, thus, zener diode D2 allows transistor Q1 to be biased from battery BT1 through resistor R3.

Inverter circuit Iv also includes switching transistors Q2 and Q3, the gates of which are connected respectively through resistors R7 and R8 to feedback coils F1 and F2 in transformers T1 and T2. In the illustrated embodiment, the output transformer is a double wound transformer in order to provide adequate current to illuminate the several fluorescent lamps coupled to the output circuit. The feedback coils are center tapped to the source of switching transistor Q1 from current limiting resistor R6 through capacitor C4 and resistor R10. The end taps of feedback windings F1 and F2 are connected respectively to the gates of transistors Q2 and Q3 to provide the requisite oscillating gate voltages of those transistors to generate the oscillating current to the primaries P1 and P2 of the transformers T1 and T2. Primaries P1 and P2 are center tapped to battery BT1 through current liiiiiting inductors L1 and L2, providing the output current to transformers T1 and T2. The end taps of primary windings P1 and P2 are connected respectively to the drain/source of transistors Q2 and Q3. Diode D4 is a bi-directional suppressor connected between the gate of transistor Q2 and battery BT1 to smooth the transient start-up voltage applied to those transistors.

Output circuit O of the multilamp generator standby ballast includes output windings S1 and S2 connected in parallel across the illustrated three fluorescent lamps in the emergency lighting circuit FL1, FL2 and FL3. Current limiting capacitors C5, C6, and C7, respectively, are connected in series with each one of the fluorescent lamps FL1, FL2 and FL3 as current limiting impedance to maintain the current flow through the lamps at their rated steady state condition. Switches K1, K2 and K3 operated by relays contained therein are connected, respectively in series with each one of the fluorescent lamps. The coils of relays K1, K2 and K3 are connected to the output of rectifier D1, such that when the rectifier is providing the charging current to the battery signifying that the AC mains supply is normally powering the fluorescent lamps, the switches K1, K2 and K3 respectively open such that the generator standby ballast is not providing power to the lamps. When the AC mains power supply fails and prior to the startup and stabilization of the standby generator AC power, switches K1, K2 and K3 will connect the lamps FL1, FL2 and FL3 respectively into the output circuit so that the generator standby ballast S may immediately provide limiting power to the lamps. On this occurrence, the removal of the bias from the rectifier D1 through the zener diode D2 to the base of switching transistor Q1 allows the base of the transistor Q1 to be saturated and provide battery power to the feedback coils in F1 and F2 and transformers T1 and T2 thereby firing transistors Q2 and Q3. The initial surge of current through primaries P1 and P2 caused by the initiation of conduction of transistors Q2 and Q3 provides the high AC voltage necessary to lamps FL1, FL2 and FL3 to ensure startup ionization of the gases for illumination by the step up in voltage from the primaries P1 and P2 through secondaries S1 and S2. As transistors Q2 and Q3 and the inverter oscillate the steady AC current is provided through primaries P1 and P2 from battery BT1 being limited and smoothed through inductors L1 and L2. In the output circuit, capacitors C5, C6 and C7 assume their current limiting role on lamps FL1, FL2 and FL3 such that the current through the lamps maintains their illumination at approximately their rated value.

As with the single lamp embodiment of the invention illustrated and described in connection with FIG. 2, the multi (e.g., 3 lamp) embodiment of FIG. 3 also operates at relatively high power for the short operating period. Similarly to the embodiment above, the inverter transistors, related output circuit capacitors and the transformer are potted to assist in the dissipation of the heat generated by operating in this high current mode. Absent this additional protection for the components involved, the transistors, and likely other components would fail due to the high operating temperatures developed.

Additionally contained in the embodiment of the invention illustrated in FIG. 3 are a warning buzzer LS1 which sounds when the generator standby ballast assumes the function of powering the fluorescent lamps FL1, FL2 and FL3. As may be appreciated by those skilled in the art, the assumption of the load by the generator standby ballast circuit is s that a change in lighting conditions may not be observed by those in the area. Other than the sounding of an alarm individuals in the illuminated area may be unaware of the failed AC mains condition. An additional shut off switch and relay are included in the circuit by means of relay K4 to ensure shut off of the normal AC ballast to the fluorescent lamps in the lighting circuit during that period when the generator standby ballast operates the lamps. Switch portion of relay K4 is placed in with the AC power supply to the normal AC ballast for the lamps, such that power to the AC ballast is interrupted when the generator standby ballast is switched into operation. This relay is installed to ensure that both the AC ballast and the generator standby ballast will not operate simultaneously. Should the AC ballast be coupled to the standby ballast circuit, the energy contained in the inductance of the AC ballast (e.g, transformer) would be placed over the contacts of relays K!, K2, and K3 likely causing damage. The inclusion of K4 permits switching the AC ballast out of the circuit when the standby ballast is included thereby preserving the relays. The conventional method previously utilized to protect such relays was to include multiple relays in series so as to dissipate the voltage retained in the AC ballast over several sets of contacts, and thus within the normal rated load of the contacts.

In the embodiment described above and illustrated in FIG. 3, the following components were utilized:

C1 2 μfd, 220 vAC
C2 3 μfd, 250 v.
C3 220 μfd, 25 v.
C4 2.2 μfd., 50 v.
C5 3300 pfd., 2 KV
C6 3300 pfd., 2 KV
C7 3300 pfd., 2 KV
C9 0.015 μfd., 63 v.
R1 10 M ohm, ½ watt
R2 10 M ohm, ½ watt
R3 5.1 K ohm, ¼ watt
R4 1 K ohm, ½ watt
R5 15 K ohm, ¼ watt
R6 3K ohm, ¼ wattt
R7 10 ohm, ¼ watt
R8 10 ohm, ¼ watt
HR9 0 ohm
R10 5.1 K ohm, ¼ watt
Q1 Transistor, PNP, 40 v., 600 mA
Q2 N Channel MosFet, $V_{DSS}$55 v., $R_{DS(on)}$12 m ohms, $I_D$72 A
Q3 N Channel MosFet, $V_{DSS}$55 v., $R_{DS(on)}$12 m ohms, $I_D$72 A
D1 Bridge DF06, 2.6 watt 600 v., 1 A.
D2 Zener 1N5231B, 0.5 watt, 5.1 v.
D3 Diode 1N4005, 600 v., 1 A.
D4 Bi-Directional Transient Suppressor P4KE18C, 18 v.
BT1 Battery 7.2 v., 2 A.h
LS1 Buzzer 80 dB
L1 24 μH, 19 m ohm
L2 24 μH, 19 m ohm
K1 SPDT, 300 VOLTS AC, 6A. Contacts; 5 v., 210 m watt coil
K2 SPDT, 300 VOLTS AC, 6A. Contacts; 5 v., 210 m watt coil
K3 SPDT, 300 VOLTS AC, 6A. Contacts; 5 v., 210 m watt coil
K4 SPDT, 300 VOLTS AC, 6A. Contacts; 5 v., 210 m watt coil
T1 Transformer
  S1 400 turns, 32 ga.
  P1 10 turns, center tapped, 20 ga.
  P1 10 turns, center tapped, 25 ga.
T2 Transformer
  S2 400 turns, 32 ga.
  P2 10 turns, center tapped, 20 ga.
  F1 10 turns, center tapped, 25 ga.

The disclosed embodiments are to be considered in all respects as illustrative and not restrictive. The scope of the invention is to be defined by the appended claims rather than the foregoing descriptions and other embodiments which come into the meaning and range of equivalency of the claims are therefore intended to be included within the scope thereof.

What is claimed is:

1. A standby backup ballast for a fluorescent lamp in a lighting circuit normally powered by a primary AC power supply having a standby generator for providing auxiliary AC power to the lighting circuit on failure of the primary AC supply, comprising:

a. A battery having a high discharge rate;

b. A rectifier charging circuit adapted to be connected to be powered by the primary AC supply to the lighting circuit during normal operation of the primary AC power supply, said charging circuit disconnectably connected to said battery while the primary AC supply is providing AC power to the lighting circuit;

c. An inverter disconnectably connected to said battery upon failure of the primary AC supply and during startup and stabilized operation of the standby generator, the output of said inverter switchably oscillating the voltage of said battery to create an AC output current at said battery voltage to an output circuit including a transformer to step up the inverter created AC output from battery level voltage to a continuing AC voltage approximately equal to the rated voltage of the lamp, said output circuit disconnectably connected to the fluorescent lamp in the lighting circuit during the period said inverter is connected to said battery; said output circuit additionally including capacitive reactance in series with said fluorescent lamp, selected to pass an initial AC voltage surge to the connected lamp as said inverter is initially connected to said battery and thereafter limit the AC current of said connected output circuit to a value substantially at the rated current of the fluorescent lamp during the period starting at primary AC system failure and ending when the standby generator provides stabilized auxiliary AC power to the connected fluorescent lamp;

whereby said standby backup ballast, upon failure of the primary AC supply and during the interim period as the standby generator comes on line to supply auxiliary stabilized AC power to the lighting circuit, said backup ballast supplies the fluorescent lamp with interim AC power, at sufficient voltage to start the lamp illuminating and thereafter supplying sufficient AC current to operate the lamp substantially at its rated lumen level.

2. The standby backup ballast of claim 1 wherein said transformer includes a double winding of primary coils connected in parallel with said inverter inductively coupled with a double winding of secondary coils connected to said output circuit whereby output AC current is generated in said output circuit to supply more than one fluorescent lamp connected to said output circuit.

3. The standby backup ballast of claim 1 wherein said inverter circuit includes a sound alarm operable during the period said inverter is connected to said battery.

4. The standby backup ballast of claim 1 wherein said rectifier is a full wave rectifier.

5. The standby ballast of claim 1 wherein said inverter is a full wave inverter.

6. The standby ballast of claim 1 wherein said transformer is comprised of multiple primary windings, connected in parallel with each other and to said AC output of said inverter and battery, and an equal number of secondary windings, connected in parallel with each other and said output circuit including a fluorescent lamp.

7. The standby ballast of claim 1 wherein the output of said rectifier circuit includes the coil of a relay switch for sensing the absence of supply of AC power to said rectifier by either of the primary or auxiliary AC power supplies and the operative switch of said relay is connected in series with an AC ballast driving the fluorescent lamp and said switch is in the normally open position when said inverter is connected to said battery whereby said switch disconnects the AC ballast whenever said battery is providing power to said output circuit.

8. The standby backup ballast of claim 1 wherein said inverter components and said transformer are coupled to a heat sink sufficient to dissipate the heat generated by the operation of said inverter for a period of at least one minute.

9. The standby backup ballast of claim 8 wherein said inverter components and said transformer are coupled to a heat sink sufficient to dissipate the heat generated by the operation of said inverter for a period of at least five minutes.

* * * * *